United States Patent
Xu et al.

(10) Patent No.: US 9,635,585 B2
(45) Date of Patent: Apr. 25, 2017

(54) ENERGY SAVING METHOD, SYSTEM AND DEVICE FOR BASE STATION

(71) Applicant: Huawei Technologies Co., Ltd., Shenzhen, Guangdong (CN)

(72) Inventors: Xiuqiang Xu, Shenzhen (CN); Yan Chen, Shenzhen (CN); Shunqing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 14/482,773

(22) Filed: Sep. 10, 2014

(65) Prior Publication Data
US 2015/0029858 A1 Jan. 29, 2015

Related U.S. Application Data

(63) Continuation of application No. PCT/CN2013/072435, filed on Mar. 12, 2013.

(30) Foreign Application Priority Data

Mar. 12, 2012 (CN) .......................... 2012 1 0063697

(51) Int. Cl.
*H04W 28/08* (2009.01)
*H04W 52/02* (2009.01)
*H04W 52/34* (2009.01)

(52) U.S. Cl.
CPC ....... *H04W 28/08* (2013.01); *H04W 52/0206* (2013.01); *H04W 52/34* (2013.01); *Y02B 60/50* (2013.01)

(58) Field of Classification Search
None
See application file for complete search history.

(56) References Cited

U.S. PATENT DOCUMENTS

| 7,813,695 B2* | 10/2010 | Haartsen | H04B 7/2606 370/229 |
| 8,989,136 B2* | 3/2015 | Hsu | H04W 52/0225 370/328 |

(Continued)

FOREIGN PATENT DOCUMENTS

| CN | 101472317 A | 7/2009 |
| CN | 101841859 A | 9/2010 |

(Continued)

OTHER PUBLICATIONS

"$3^{rd}$ Generation Partnership Project; Technical Specification Group Radio Access Networks; Evolved Universal Terrestrial Radio Access (E-UTRA); Potential solutions for energy saving for E-UTRAN (Release 10)," 3GPP TR 36.927, 1.0.0, pp. 1-19, $3^{rd}$ Generation Partnership Project, Valbonne, France (Nov. 2010).

Primary Examiner — Donald Mills
(74) Attorney, Agent, or Firm — Leydig, Voit & Mayer, Ltd.

(57) ABSTRACT

An energy saving method, system and device for a base station, applied in the technical field of communications. The energy saving method comprises: if the number of user equipments sending a service request in the coverage of a coverage base station is greater than a first threshold, sending a second activation request to a capacity boosting base station, wherein the second activation request is used for requesting the capacity boosting base station in a dormant state to enter an intermediate state from the dormant state, and the intermediate state refers to that in the intermediate state, the capacity boosting base station bears a user equipment in a connected state rather than a user equipment in an idle state; and after the capacity boosting base station enters (Continued)

the intermediate state, transferring the user equipment to be connected to the capacity boosting base station in the intermediate state.

20 Claims, 12 Drawing Sheets

(56) References Cited

U.S. PATENT DOCUMENTS

| | | | |
|---|---|---|---|
| 2008/0219213 A1* | 9/2008 | Natarajan | H04L 47/11 370/331 |
| 2009/0252073 A1 | 10/2009 | Kim et al. | |
| 2009/0253461 A1* | 10/2009 | Kuwahara | H04W 52/0206 455/561 |
| 2011/0007681 A1 | 1/2011 | Park et al. | |
| 2011/0044284 A1 | 2/2011 | Voltolina et al. | |
| 2011/0110520 A1* | 5/2011 | Ness | H04W 48/20 380/270 |
| 2011/0237257 A1 | 9/2011 | Soliman et al. | |
| 2012/0033611 A1* | 2/2012 | Wu | H04W 24/02 370/328 |
| 2012/0039226 A1* | 2/2012 | Yang | H04W 52/0277 370/311 |
| 2012/0142328 A1* | 6/2012 | Awoniyi | H04W 36/22 455/418 |
| 2014/0073311 A1 | 3/2014 | Xu et al. | |

FOREIGN PATENT DOCUMENTS

| | | |
|---|---|---|
| CN | 102083179 A | 6/2011 |
| CN | 103313357 B | 12/2016 |
| EP | 2355594 A1 | 8/2011 |
| WO | WO 2011127851 A2 | 10/2011 |

* cited by examiner

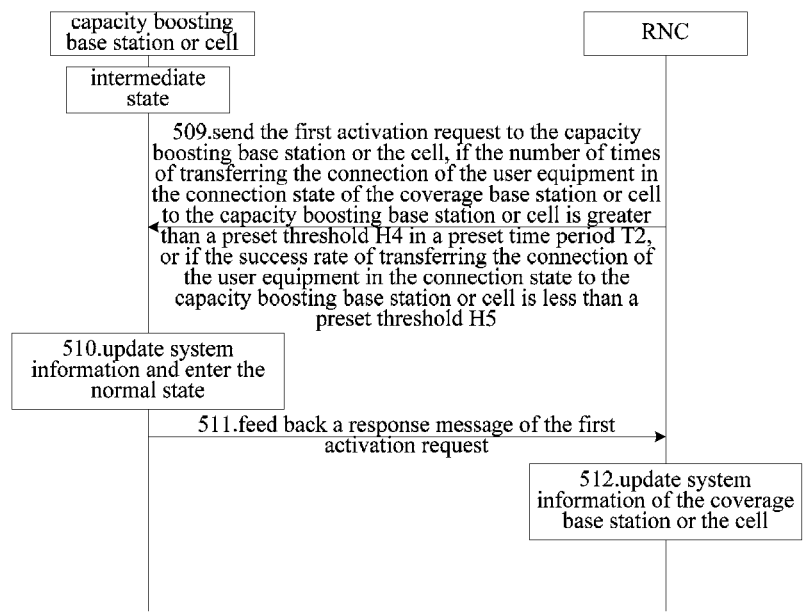
Fig. 10d1

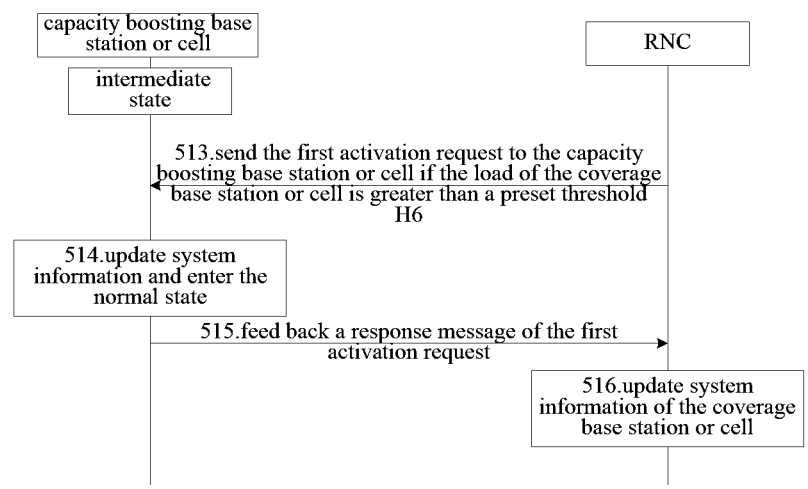
Fig. 10d2

ENERGY SAVING METHOD, SYSTEM AND DEVICE FOR BASE STATION

CROSS-REFERENCE TO RELATED APPLICATIONS

This application is a continuation of International Patent Application No. PCT/CN2013/072435, filed on Mar. 12, 2013, which claims priority to Chinese Patent Application No. 201210063697.8, filed on Mar. 12, 2012, both of which are hereby incorporated by reference in their entireties.

FIELD

The disclosure relates to the field of communication technology, and in particular to a power saving method, device and system for a base station or cell.

BACKGROUND

Currently, wireless communication service has developed from a low speed voice service to a high speed multimedia data service. In order to meet a growing requirement on high capacity and high data rate, in addition to applying a wireless access technology with a higher capacity and a higher transmission rate, operators usually provide a basic network coverage and further deploy a base station or cell of different standard or different modality in the same region for capacity boosting. A network providing the basic network coverage is referred to as Network One, and a network formed by a base station or cell providing capacity boosting is referred to as Network Two herein. For convenience of description, the base station or cell of Network One is referred to as a coverage base station or cell (Coverage Base Station), and the base station or cell of Network Two is referred to as a capacity boosting base station or cell (Capacity Boosting Base Station) hereinafter.

As shown in FIG. 1a, micro/pico base stations (Micro/Pico Base Station) B, C and D of Network Two are deployed at hot spots in a coverage of a macro base station or cell A of Network One for the purpose of capacity expansion, in this case, the base station or cell A of Network One is a coverage base station or cell, and the base stations or cells B, C and D of Network Two are capacity boosting base stations or cells. As shown in FIG. 1b, a macro base station or cell F of Network One provides a basic network coverage for a certain region, and a macro base station or cell E of Network Two is a co-site base station or cell with the base station or cell F to perform capacity boosting, in this case, the base station or cell F of Network One is a coverage base station or cell, and the base station or cell E of Network Two is a capacity boosting base station or cell. As shown in FIG. 1c, a macro base station or cell of Network One provides a basic network coverage for a certain region, and a macro base station or cell of Network Two is deployed in a coverage of Network One to provide capacity boosting in the region, but does not a co-site base station or cell with the base station or cell of Network One, in this case, the base station or cell of Network One is a coverage base station or cell, and the base station or cell of Network Two is a capacity boosting base station or cell. Network One may be a GSM/EDGE Radio Access Network (GERAN) or a Universal Terrestrial Radio Access Network (Universal Terrestrial Radio Access Network, UTRAN), and Network Two may be an Evolved Universal Terrestrial Radio Access Network (E-UTRAN). Network One has a different standard from Network Two.

In the above description, a coverage base station or cell and a large number of capacity boosting base stations or cells are deployed to satisfy the requirement on high capacity and high data rate, accordingly, power consumption is increased. Therefore, power saving for a wireless network is a problem to be addressed urgently.

In a conventional power saving method for a base station, a management system notifies a base station to perform a first predetermined operation, i.e., entering a complete dormant state or shutting down automatically, if load of the base station is less than a certain threshold; and notifies the base station to perform a second predetermined operation, i.e., waking up or starting up automatically, if load of a neighboring region overlapped with the coverage of the base station is greater than a certain threshold.

In another conventional power saving method for a base station, a coverage base station or cell activates all capacity boosting base stations or cells in a dormant state within a coverage of the coverage base station or cell when the coverage base station or cell detects that its load is high; if some of the capacity boosting base stations or cells can not effectively absorb the load of the coverage base station or cell after being activated, these capacity boosting base stations or cells enter the dormant state to save power when a condition of entering the dormant state is satisfied again.

Two problems may be caused when these two power saving methods for the base station described above are applied. Firstly, in a case where a user of the coverage base station or cell initiates a short-term service that only can be born by the capacity boosting base station or cell, the service can not be born by the network if the capacity boosting base station or cell does not start up because the current total amount of load of the coverage base station does not reach an amount that causes the capacity boosting base station or cell to start up, and user experience is seriously affected. Secondly, even the capacity boosting base station or cell can start up in a timely manner to bear the service, the capacity boosting base station or cell may enter the dormant state again due to a less amount of the load after the service is finished. If there are a large number of such users and these users are dispersed, the capacity boosting base station or cell will frequently start up and shut down. During this process, a user in an idle state frequently initiates a different standard reselection, which increases power consumption of the terminal and causes a serious signaling impact on the network by a different standard update (such as RA/TA) for the different standard reselection.

SUMMARY

Embodiments of the invention provide a power saving method, system and apparatus for a base station, to achieve power saving of the base station.

A power saving method for a base station, which is applied to a base station controller, includes:

sending a second activation request to a capacity boosting base station if the number of user equipment sending a service request within a coverage of a coverage base station is greater than a first threshold, where the second activation request is configured to request the capacity boosting base station in a dormant state to enter an intermediate state from the dormant state, and the intermediate state indicates a state in which the capacity boosting base station bears user equipment in a connection state but does not bear user equipment in an idle state; and transferring a connection of the user equipment to the capacity boosting base station in the intermediate state after the capacity boosting base station enters the intermediate state.

Another power saving method for a base station includes:

receiving a second activation request for requesting a capacity boosting base station to enter an intermediate state from a dormant state, where the capacity boosting base station in the intermediate state bears user equipment in a connection state but does not bear user equipment in an idle state, and the capacity boosting base station in the dormant state does not bear user equipment in any state;

entering the intermediate state from the current dormant state and sending a response message of the second activation request to a base station controller in response to the second activation request; and establishing a connection with user equipment whose connection is transferred to the capacity boosting base station after the intermediate state is entered.

A base station controller includes:

an antenna unit, configured to send a second activation request to a capacity boosting base station if the number of user equipment sending a service request within a coverage of a coverage base station is greater than a first threshold, where the second activation request is configured to request the capacity boosting base station in a dormant state to enter an intermediate state from the dormant state, and the intermediate state indicates a state in which the capacity boosting base station bears user equipment in a connection state but does not bear user equipment in an idle state; and a processor unit, configured to transfer a connection of the user equipment to the capacity boosting base station in the intermediate state after the capacity boosting base station enters the intermediate state.

A base station according to an embodiment of the invention includes:

an antenna unit, configured to receive a second activation request for requesting the base station to enter an intermediate state from a dormant state, where the base station in the intermediate state bears user equipment in a connection state but does not bear user equipment in an idle state, and the base station in the dormant state does not bear user equipment in any state;

a processor unit, configured to enter the intermediate state from the current dormant state and send a response message of the second activation request to a base station controller in response to the second activation request; and a link establishing unit, configured to establish a connection with user equipment whose connection is transferred to the base station after the intermediate state is entered.

Furthermore, an embodiment of the invention provides a communication system including a capacity boosting base station, a coverage base station and a base station controller, where the base station controller is configured to send a second activation request to the capacity boosting base station if the number of user equipment sending a service request within a coverage of the coverage base station is greater than a first threshold, where the second activation request is configured to request the capacity boosting base station in a dormant state to enter an intermediate state from the dormant state, and the intermediate state indicates a state in which the capacity boosting base station bears user equipment in a connection state but does not bear user equipment in an idle state; and to transfer a connection of the user equipment to the capacity boosting base station in the intermediate state after the capacity boosting base station enters the intermediate state; and the capacity boosting base station is located within the coverage of the coverage base station and is configured to receive the second activation request for requesting the capacity boosting base station to enter the intermediate state from the dormant state, where the capacity boosting base station in the intermediate state bears user equipment in a connection state but does not bear user equipment in an idle state, and the capacity boosting base station in the dormant state does not bear user equipment in any state; to enter the intermediate state from the current dormant state and send a response message of the second activation request to the base station controller in response to the second activation request; and to establish a connection with the user equipment whose connection is transferred to the capacity boosting base station after the intermediate state is entered.

According to the method and system in the embodiments of the invention, the capacity boosting base station or cell enters the intermediate state and the capacity boosting base station or cell in the intermediate state does not bear user equipment in the idle state, thereby avoiding mobility of connection of the user equipment in the idle state between the coverage base station or cell and the capacity boosting base station or cell.

BRIEF DESCRIPTION OF THE DRAWINGS

FIG. 10D1 is a flowchart illustrating a capacity boosting base station or cell entering a normal state from an intermediate state in an implementation according to an embodiment of the invention;

FIG. 10D2 is another flowchart illustrating a capacity boosting base station or cell entering a normal state from an intermediate state in an implementation according to an embodiment of the invention;

DETAILED DESCRIPTION

A power saving method for a base station is provided according to an embodiment of the invention, which is a method performed by a base station controller managing a coverage base station or cell in a system, and a capacity boosting base station or cell in the method according to the embodiment of the invention is within a coverage of the coverage base station or cell.

Figure 1A:
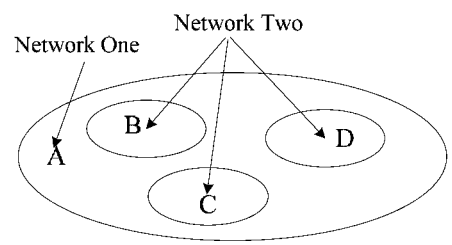
FIG. 1a is a schematic diagram of a conventional network scenario of a coverage base station or cell and a capacity boosting base station or cell.
Figure 1B:
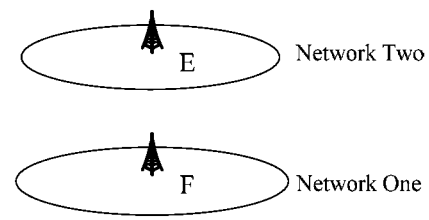
FIG. 1b is a schematic diagram of another conventional network scenario of a coverage base station or cell and a capacity boosting base station or cell.
Figure 1C:
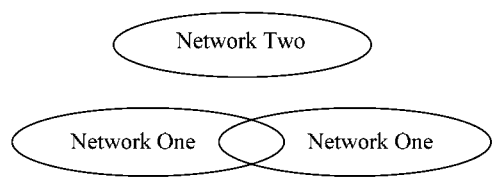
FIG. 1c is a schematic diagram of another conventional network scenario of a coverage base station or cell and a capacity boosting base station or cell.

Technical solutions according to the embodiments of the invention are applicable to the systems as shown in FIG. 1a, FIG. 1b and FIG. 1c. It should be understood that the technical solutions according to the embodiments of the invention are also applicable to various communication system networks, such as the Global System of Mobile communication (abbreviated as "GSM") system, the Code Division Multiple Access (abbreviated as "CDMA") system, the Wideband Code Division Multiple Access (abbreviated as "WCDMA") system, the General Packet Radio Service (abbreviated as "GPRS"), the Long Term Evolution (abbreviated as "LTE") system, the LTE Frequency Division Duplex (abbreviated as "FDD") system, the LTE Time Division Duplex (abbreviated as "TDD"), the Universal Mobile Telecommunication System (abbreviated as "UMTS"), and the Worldwide Interoperability for Microwave Access (abbreviated as "WiMAX") communication system. Network One and Network Two may be two different network systems of the above.

In the embodiments of the invention, User Equipment (abbreviated as "UE") may be referred to as a terminal, a Mobile Station (abbreviated as "MS"), a mobile terminal, etc. The user equipment may communicate with one or more core networks via a Radio Access Network (abbreviated as "RAN"). For example, the user equipment may be a mobile phone (or referred to as "cellular" phone), a computer having a mobile terminal, etc. For example, the user equipment may also be a portable mobile device, a pocket mobile device, a hand-held mobile device, a mobile device built into a computer or a vehicle-mounted mobile device, which exchanges voice and/or data with the radio access network.

Figure 2:
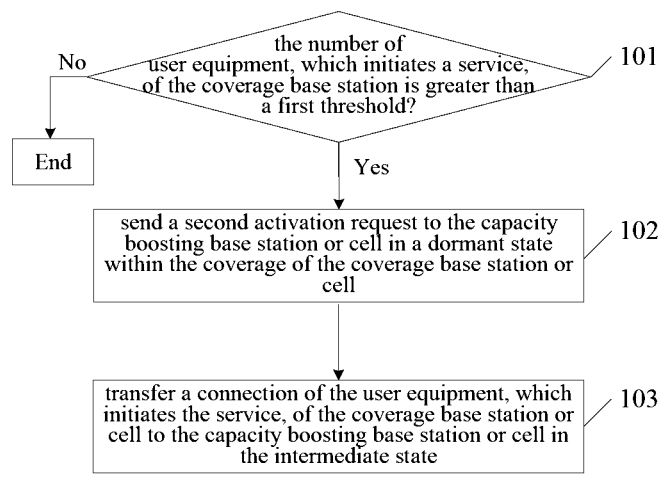
FIG. 2 is a flowchart of a power saving method for a base station according to an embodiment of the invention.

A flowchart of a power saving method for a base station according to an embodiment of the invention is shown in FIG. 2. The method includes Step 101 to Step 103.

In Step 101, it is detected whether the number of user equipment initiating a service within a coverage of a coverage base station or cell is greater than a first threshold. A subsequent step of the method, which is Step 102, is performed if the number of the user equipment is greater than the first threshold. The method according to the embodiment is not adopted and the process ends if the number of the user equipment is not greater than the first threshold.

The service mentioned in the step and the application may be one or more of: 1) a service that can not be born by the coverage base station or cell but only can be born by the capacity boosting base station or cell; 2) a service that can be born by both the coverage base station or cell and the capacity boosting base station or cell but power consumption is less or power efficiency is higher when the service is born by the capacity boosting base station or cell; or 3) a service that can be born by both the coverage base station or cell and the capacity boosting base station or cell, but user experience is better when the service is born by the capacity boosting base station or cell. The above service may be considered as a special service. The user equipment initiating the above service may be determined by: 1) detecting that the user equipment is performing the above service, or 2) detecting that the user equipment has a service request requesting to establish the above service or the service request carries a service identifier of the above service.

In an implementation, the above step may not be performed. For example, if the number of user equipment is higher than the first threshold, the number of user equipment initiating the service within the coverage of the coverage base station may be reported or sent to the base station controller directly, or the number of user equipment initiating the service within the coverage of the coverage base station may be recorded directly. In an implementation, the first threshold may be set to be 0, that is, the following step may be triggered directly by initiating the above service by the user equipment. Therefore, the step of detection may not be performed.

In Step 102, a second activation request is sent to the capacity boosting base station or cell in a dormant state. The second activation request herein is configured to request the capacity boosting base station or cell in the dormant state to enter an intermediate state from the dormant state.

It may be understood that, the base station controller may request all the capacity boosting base station or cell in the dormant state to enter the intermediate state, or may request a few of the capacity boosting base stations or cells in the dormant state to enter the intermediate state.

The capacity boosting base station or cell in the intermediate state only bears user equipment in a connection state but does not bear user equipment in an idle state. The capacity boosting base station or cell in the intermediate state may also take over user equipment in the connection state whose connection is transferred from the coverage base station or cell.

The capacity boosting base station or cell in the dormant state does not bear user equipment in any state.

In Step 103, the connection of the user equipment, which initiates the service, of the coverage base station or cell is transferred to the capacity boosting base station or cell in the intermediate state.

In a case where the user equipment in the idle state is to connect to the capacity boosting base station or cell in the intermediate state, a connection is firstly established between the coverage base station or cell and the user equipment in the idle state, to cause the user equipment in the idle state to be user equipment in the connection state, and the user equipment is then connected to the capacity boosting base station or cell in the intermediate state by user transferring between the coverage base station or cell and the capacity boosting base station or cell.

In the power saving method for the base station in the embodiment of the invention, the second activation request is sent to all or a few of the capacity boosting base stations or cells in the dormant state to request the capacity boosting base stations or cells in the dormant state to enter the intermediate state. In this way, because the capacity boosting base station or cell in the intermediate state can bear the user equipment in the connection state, the connection of the user, which initiates the special service, of the coverage base station or cell may be transferred to the capacity boosting base station or cell in the intermediate state, thereby satisfying the requirement of the user equipment on the special service.

In the embodiment of the invention, the capacity boosting base station or cell does not bear the user equipment in the idle state after the capacity boosting base station or cell enters the intermediate state from the dormant state, thereby avoiding mobility of the connection of the user equipment in the idle state between the coverage base station or cell and the capacity boosting base station or cell.

Figure 3:
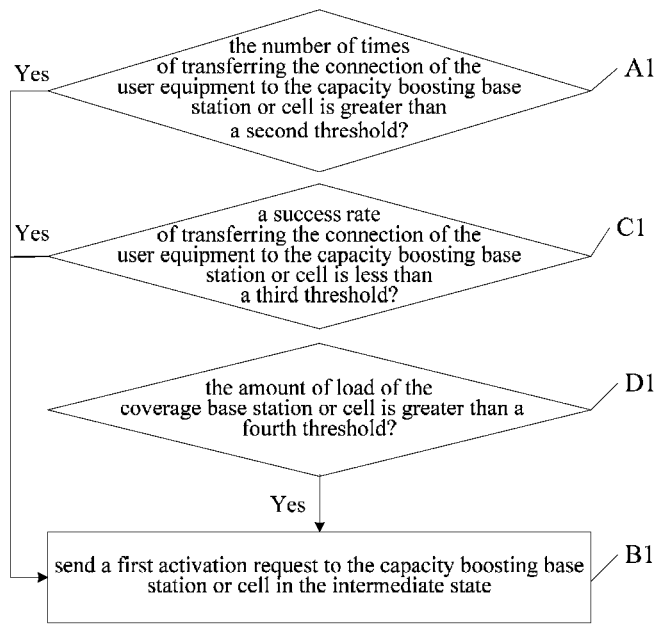
FIG. 3 is a flowchart of another power saving method for a base station according to an embodiment of the invention.

Referring to FIG. 3, in a specific embodiment, the base station controller managing the coverage base station or cell in the system may achieve power saving for the base station by the following steps A1 to D1. In this embodiment, the capacity boosting base station or cell enters the normal state from the intermediate state.

In Step A1, it is detected whether the number of times of transferring the connection of the user equipment in the connection state to the capacity boosting base station or cell in the intermediate state is greater than a second threshold. The second threshold may be set based on the capacity of the system to ensure better user experience.

In Step B1, a first activation request is sent to the capacity boosting base station or cell in the intermediate state to cause the capacity boosting base station or cell in the intermediate state to enter a normal state, if the number of times of transferring the connection of the user equipment in the connection state to the capacity boosting base station or cell in the intermediate state is greater than the second threshold.

The first activation request herein may cause the capacity boosting base station to enter the normal state from the dormant state or the intermediate state. In this embodiment, the first activation request is configured to request the capacity boosting base station or cell to enter the normal state from the intermediate state. The capacity boosting base station or cell in the normal state can bear user equipment in any state.

The base station controller may request all the capacity boosting base station or cell in the intermediate state to enter the normal state, or may request a few of the capacity boosting base stations or cells in the intermediate state to enter the normal state.

In Step C1, the base station controller may detect whether a success rate of transferring the connection of the user equipment in the connection state of the coverage base station or cell to the capacity boosting base station or cell in the intermediate state is less than a third threshold. Step B1 is performed if the success rate is less than the third threshold. The process ends if the success rate is not less than the third threshold.

In Step D1, the base station controller may further detect whether the amount of load of the coverage base station or cell is greater than a fourth threshold. Step B1 is performed if the amount of load is greater than the fourth threshold. The process ends if the amount of load is not greater than the fourth threshold.

The second threshold may be set based on the capacity of the system to ensure better user experience. The state of the base station is changed by setting these thresholds to save power.

Figure 4:
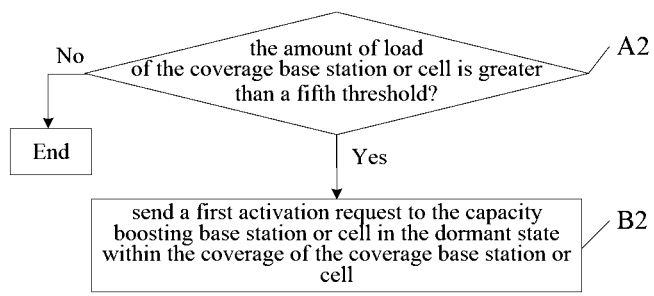
FIG. 4 is a flowchart of another power saving method for a base station according to an embodiment of the invention.

Referring to FIG. 4, in a specific embodiment, the base station controller managing the coverage base station or cell may achieve power saving for the base station by the following steps A2 to B2. In this embodiment, the capacity boosting base station or cell enters the normal state from the dormant state.

In Step A2, it is detected whether the amount of load of the coverage base station or cell is greater than a fifth threshold. Step B2 is performed if the amount of load is greater than the fifth threshold. The process ends if the amount of load is not greater than the fifth threshold.

In Step B2, a first activation request is sent to the capacity boosting base station or cell in the dormant state within the coverage of the coverage base station or cell.

The first activation request herein is configured to request the capacity boosting base station or cell to enter a normal state from the dormant state. The capacity boosting base station or cell in the normal state can bear user equipment in any state.

It may be understood that, the base station controller may request all the capacity boosting base station or cell in the dormant state to enter the normal state, or may request a few of the capacity boosting base stations or cells in the dormant state to enter the normal state.

Another power saving method for a base station is further provided according to an embodiment of the invention, which is a method performed by a capacity boosting base station or cell, and the capacity boosting base station or cell is in a coverage of a coverage base station or cell.

Figure 5:
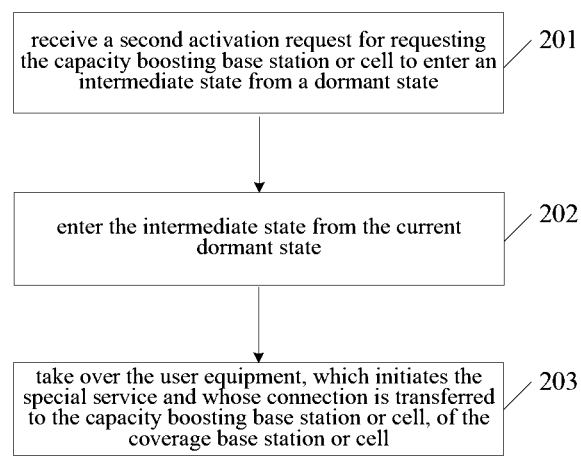
FIG. 5 is a flowchart of another power saving method for a base station according to an embodiment of the invention.

The power saving method for the base station is applicable to the systems as shown in FIG. 1a, FIG. 1b and FIG. 1c, and a flowchart of the power saving method for the base station is shown in FIG. 5, which includes Step 201 to Step 203.

In Step 201, a second activation request for requesting the capacity boosting base station or cell to enter an intermediate state from a dormant state is received.

It may be understood that, all or a few of the capacity boosting base stations or cells in the dormant state are to be activated if it is detected that the number of user equipment, which initiates a special service, of the coverage base station or cell is greater than a preset value, and the second activation request is sent to these capacity boosting base stations or cell.

In Step 202, the capacity boosting base station or cell enters the intermediate state from the current dormant state.

In Step 203, the capacity boosting base station or cell takes over the user equipment, which initiates the special service and whose connection is transferred to the capacity boosting base station or cell, of the coverage base station or cell.

The capacity boosting base station or cell in the intermediate state bears user equipment in a connection state but does not bear user equipment in an idle state. The capacity boosting base station or cell may take over user equipment in the connection state whose connection is transferred to the capacity boosting base station or cell from the coverage base station or cell.

The capacity boosting base station or cell in the dormant state does not bear user equipment in any state.

In the embodiment of the invention, the capacity boosting base station or cell enters the intermediate state from the current dormant state after receiving the second activation request. In this way, because the capacity boosting base station or cell in the intermediate state can bear user equipment in the connection state, the connection of the user, which initiates the service, of the coverage base station or cell may be transferred to the capacity boosting base station or cell in the intermediate state, thereby satisfying the requirement of the user equipment on the service.

In the embodiment of the invention, the capacity boosting base station or cell does not bear user equipment in the idle state after the capacity boosting base station or cell enters the intermediate state from the dormant state, thereby avoiding mobility of the connection of the user equipment in the idle state between the coverage base station or cell and the capacity boosting base station or cell.

Figure 6:
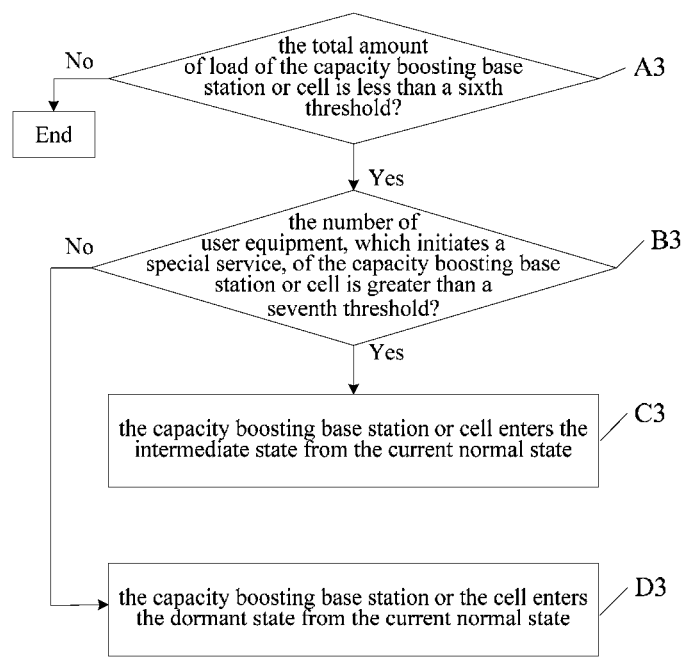
FIG. 6 is a flowchart of another power saving method for a base station according to an embodiment of the invention.

Referring to FIG. 6, in a specific embodiment, the capacity boosting base station or cell may achieve power saving for the base station by the following steps A3 to D3. In this embodiment, the capacity boosting base station or cell enters the intermediate state or the dormant state from the normal state.

In Step A3, it is detected whether the total amount of load of the capacity boosting base station or cell is less than a sixth threshold.

In Step B3, it is detected whether the number of user equipment, which initiates the service, of the capacity boosting base station or cell is greater than a seventh threshold, if the total amount of load is less than the sixth threshold. Step C3 is performed if the number of user equipment is greater than the seventh threshold, and Step D3 is performed if the number of user equipment is not greater than the seventh threshold.

In Step C3, the capacity boosting base station or cell enters the intermediate state from the current normal state.

In Step D3, the capacity boosting base station or cell enters the dormant state from the current normal state.

It should be noted that the capacity boosting base station or cell transfers the connection of user equipment initiating a non-special service to the coverage base station or cell before the capacity boosting base station or cell enters the intermediate state, and the capacity boosting base station or cell transfers connections of all user equipment in the connection state to the coverage base station or cell before the capacity boosting base station or cell enters the dormant state.

Figure 7:
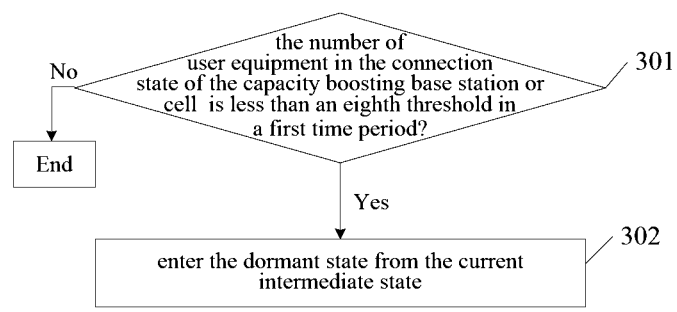
FIG. 7 is a flowchart of another power saving method for a base station according to an embodiment of the invention.

Referring to FIG. 7, in a specific embodiment, the capacity boosting base station or cell may achieve power saving for the base station by the following steps 301 to 302. In this embodiment, the capacity boosting base station or cell enters the dormant state from the intermediate state.

In Step 301, it is detected whether the number of user equipment in the connection state of the capacity boosting base station or cell is always less than an eighth threshold in a first time period. Step 302 is performed if the number of the user equipment in the connection state is less than the eighth threshold in the first time period, and the process ends if the number of the user equipment in the connection state is not less than the eighth threshold in the first time period.

In Step 302, the capacity boosting base station or cell enters the dormant state from the current intermediate state.

It should be noted that the capacity boosting base station or cell transfers connections of all the user equipment in the connection state to the coverage base station or cell before the capacity boosting base station or cell enters the dormant state.

Figure 8:
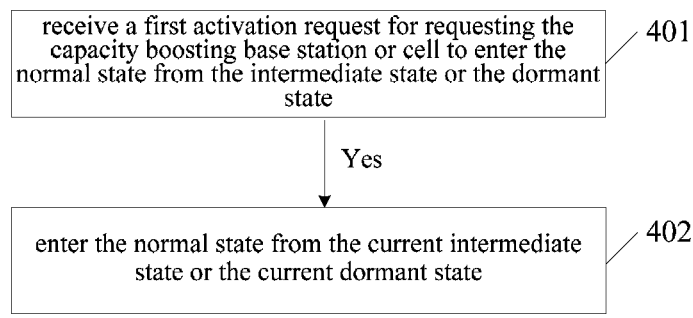
FIG. 8 is a flowchart of another power saving method for a base station according to an embodiment of the invention.

Referring to FIG. 8, in a specific embodiment, the capacity boosting base station or cell may achieve power saving for the base station by the following steps 401 to 402. In this embodiment, the capacity boosting base station or cell enters the normal state from the intermediate state or the dormant state.

In Step 401, a first activation request for requesting the capacity boosting base station or cell to enter the normal state from the intermediate state or the dormant state is received.

In Step 402, the capacity boosting base station or cell enters the normal state from the current intermediate state or the current dormant state.

In a specific embodiment, in a case where the capacity boosting base station or cell is in the normal state:

the capacity boosting base station or cell enters the intermediate state from the normal state if it is detected that the amount of load of the capacity boosting base station or cell is less than a preset value and the number of user equipment, which initiates the special service, of the capacity boosting base station or cell is greater than a preset value.

It should be noted that the capacity boosting base station or cell transfers the connection of user equipment initiating a non-special service to the coverage base station or cell before the capacity boosting base station or cell enters the intermediate state.

Specifically, the capacity boosting base station or cell may reset a cell selection parameter and update system information to forbid the user equipment in the idle state from residing before the capacity boosting base station or cell enters the intermediate state.

The capacity boosting base station or cell notifies the base station controller managing the coverage base station or cell of a state transition message indicating that the capacity boosting base station or cell enters the intermediate state from the normal state, after the capacity boosting base station or cell enters the intermediate state. The base station controller may reset a cell reselection parameter of the coverage base station or cell and update system information of the coverage base station or cell to forbid the user in the idle state of the coverage base station or cell from reselecting the capacity boosting base station or cell, after the base station controller receives the message indicating that the capacity boosting base station or cell enters the intermediate state from the normal state.

In another specific embodiment, in a case where the capacity boosting base station or cell is in the normal state:

the capacity boosting base station or cell enters the dormant state from the normal state if it is detected that the amount of load of the capacity boosting base station or cell is less than a preset value and the number of the user equipment, which initiates the special service, of the capacity boosting base station or cell is less than a preset value.

It should be noted that the capacity boosting base station or cell transfers connections of all the user equipment in the connection state to the coverage base station or cell before the capacity boosting base station or cell enters the dormant state.

Specifically, the capacity boosting base station or cell may reset a cell selection parameter and update system information to forbid the user in the idle state from residing before the capacity boosting base station or cell enters the dormant state.

The capacity boosting base station or cell notifies the base station controller managing the coverage base station or cell of a state transition message indicating that the capacity boosting base station or cell enters the dormant state from the normal state, after the capacity boosting base station or cell enters the dormant state. The base station controller may reset a cell reselection parameter of the coverage base station or cell and update system information of the coverage base station or cell to forbid the user in the idle state of the coverage base station or cell from reselecting the capacity boosting base station or cell, after the base station controller receives the message indicating that the capacity boosting base station or cell enters the dormant state from the normal state.

In another specific embodiment, in a case where the capacity boosting base station or cell is in the intermediate state:

a first activation request is sent to the capacity boosting base station or cell if it is detected that the number of times of transferring the connection of the user equipment in the connection state of the coverage base station or cell to the capacity boosting base station or cell in a preset time period is greater than a preset value, or if it is detected that a success rate of transferring the connection of the user equipment in the connection state of the coverage base station or cell to the capacity boosting base station or cell is less than a preset value, or if it is detected that the amount of load of the coverage base station or cell is greater than a preset value. The first activation request herein is configured to request the capacity boosting base station or cell to enter the normal state from the intermediate state.

The capacity boosting base station or cell enters the normal state from the intermediate state when the capacity boosting base station or cell receives the first activation request.

Specifically, the capacity boosting base station or cell may reset a cell selection parameter and update system information to allow the user in the idle state to reside, before the capacity boosting base station or cell enters the normal state.

The capacity boosting base station or cell notifies the base station controller of a state transition message indicating that the capacity boosting base station or cell enters the normal state from the intermediate state by a response message of the first activation request, after the capacity boosting base station or cell enters the normal state. The base station controller may reset a cell reselection parameter of the coverage base station or cell and update system information of the coverage base station or cell to allow the user equipment in the idle state of the coverage base station or cell to reselect the capacity boosting base station or cell, after the base station controller receives the message indicating that the capacity boosting base station or cell enters the normal state from the intermediate state.

In another specific embodiment, in a case where the capacity boosting base station or cell is in the intermediate state:

the capacity boosting base station or cell enters the dormant state from the intermediate state if it is detected that the number of user equipment in the connection state of the capacity boosting base station or cell is always less than a preset value in a preset time period.

It should be noted that the capacity boosting base station or cell transfers connections of all the user equipment in the connection state to the coverage base station or cell before the capacity boosting base station or cell enters the dormant state.

Specifically, the capacity boosting base station or cell notifies the base station controller managing the coverage base station or cell of a state transition message indicating that the capacity boosting base station or cell enters the dormant state from the intermediate state, after the capacity boosting base station or cell enters the dormant state.

In another specific embodiment, in a case where the capacity boosting base station or cell is in the dormant state:

a first activation request is sent to the capacity boosting base station or cell if the coverage base station or cell or the base station controller detects that the amount of load of the coverage base station or cell is greater than a preset value. The first activation request herein is configured to request the capacity boosting base station or cell to enter the normal state from the dormant state.

The capacity boosting base station or cell enters the normal state from the dormant state when the capacity boosting base station or cell receives the first activation request.

Specifically, the capacity boosting base station or cell may reset a cell selection parameter to allow the user equipment in the idle state to reside, before the capacity boosting base station or cell enters the normal state.

The capacity boosting base station or cell notifies the base station controller of a state transition message indicating that the capacity boosting base station or cell enters the normal state from the dormant state by a response message of the first activation request, after the capacity boosting base station or cell enters the normal state. The base station controller may reset a cell reselection parameter of the coverage base station or cell and update system information of the coverage base station or cell to allow the user equipment in the idle state of the coverage base station or cell to reselect the capacity boosting base station or cell, after the base station controller receives the message indicating that the capacity boosting base station or cell enters the normal state from the dormant state.

The capacity boosting base station or cell enters the intermediate state from the dormant state when the capacity boosting base station or cell receives the second activation request.

Specifically, the capacity boosting base station or cell transfers the connection of the user equipment, which initiates the special service, of the coverage base station or cell to the capacity boosting base station or cell, after the capacity boosting base station or cell enters the intermediate state.

The capacity boosting base station or cell notifies the base station controller managing the coverage base station or cell of a state transition message indicating that the capacity boosting base station or cell enters the intermediate state from the dormant state by a response message of the second activation request, after the capacity boosting base station or cell enters the intermediate state.

Figure 9:
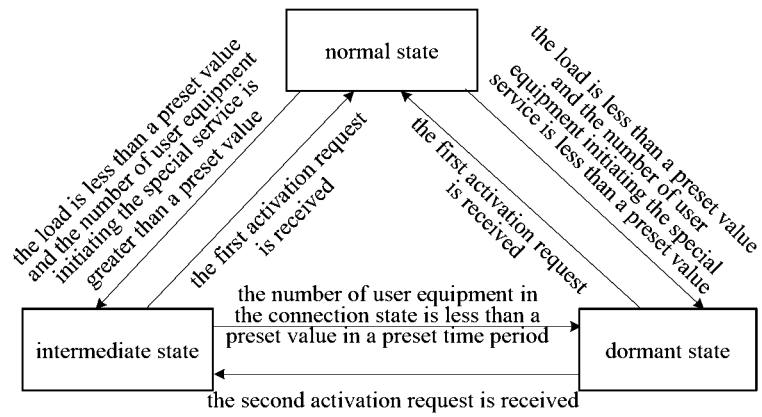
FIG. 9 is a schematic structural diagram illustrating state transition among three states of a capacity boosting base station or cell according to an embodiment of the invention.

It can be seen that, as shown in FIG. 9, in the embodiment of the invention, the capacity boosting base station or cell has three states, i.e., the normal state, the intermediate state and the dormant state. In a case where the capacity boosting base station or cell is in the normal state, the capacity boosting base station or cell enters the intermediate state if the amount of load of the capacity boosting base station or cell is less than a preset value and the number of the user equipment, which initiates the special service, of the capacity boosting base station or cell is greater than a preset value; and the capacity boosting base station or cell enters the dormant state if the amount of load of the capacity boosting base station or cell is less than a preset value and the number of the user equipment, which initiates the special service, of the capacity boosting base station or cell is less than a preset value. In a case where the capacity boosting base station or cell is in the intermediate state, the capacity boosting base station or cell enters the normal state if a first activation request is received; and the capacity boosting base station or cell enters the dormant state if the number of user equipment in the connection state of the capacity boosting base station or cell is always less than a preset value in a preset time period. In a case where the capacity boosting base station or cell is in the dormant state, the capacity boosting base station or cell enters the normal state if a first activation request is received; and the capacity boosting base station or cell enters the intermediate state if a second activation request is received.

Hereinafter, the power saving method for the base station of the invention is explained by a specific embodiment.

The coverage base station or cell and the capacity boosting base station or cell in the embodiment use different radio access technologies. For example, the coverage base station or cell uses the Universal Terrestrial Radio Access Network (UTRAN), and the capacity boosting base station or cell uses the evolved Universal Terrestrial Radio Access Network (E-UTRAN). The Radio Network Controller (RNC) is a base station controller managing the coverage base station or cell. The coverage base station or cell provides a basic network coverage, the capacity boosting base station or cell is in the coverage of the coverage base station or cell and is completely covered by the coverage base station or cell.

Figure 10A:
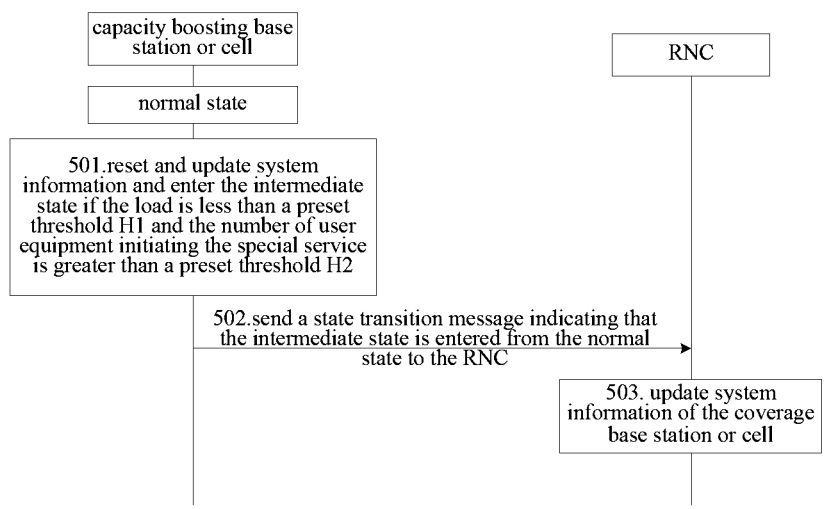
FIG. 10A is a flowchart illustrating a capacity boosting base station or cell entering an intermediate state from a normal state in an implementation according to an embodiment of the invention.

(1) Referring to FIG. 10*a*, the capacity boosting base station or cell enters the intermediate state from the normal state.

In Step 501, in a case where the capacity boosting base station or cell is in the normal state, a cellBarred parameter (cellBarred) of a System Information Block Type1 message of the capacity boosting base station or cell is set to be "barred", system information is updated, and the connection of user equipment initiating the non-special service is transferred to its coverage base station or cell, if it is detected that the load of the capacity boosting base station or cell is less than a preset threshold H1 and the number of user equipment, which initiates the special service, of the capacity boosting base station or cell is greater than a preset threshold H2. In this way, transferring of the connection of the user equipment is completed and the capacity boosting base station or cell enters the intermediate state from the normal state.

In Step 502, the capacity boosting base station or cell notifies the RNC of a state transition message indicating that the capacity boosting base station or cell enters the intermediate state from the normal state.

In Step 503, a Physical Cell ID (PCI) of the capacity boosting base station or cell is added into a Black Listed cells per freq list of a E-UTRAN Frequency and priority info list of a System Information Block Type19 message of the coverage base station or cell and system information of the coverage base station or cell is updated, after the RNC receives the message indicating that the capacity boosting base station or cell quits the normal state.

Figure 10B:
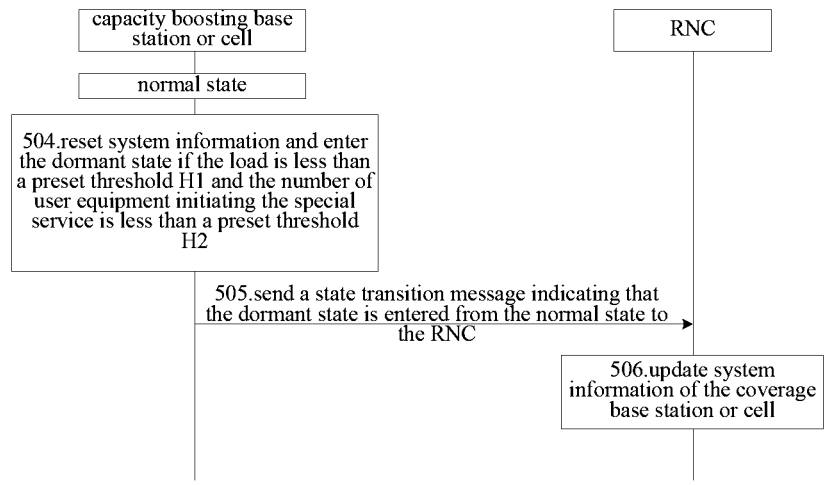
FIG. 10B is a flowchart illustrating a capacity boosting base station or cell entering a dormant state from a normal state in an implementation according to an embodiment of the invention.
Figure 10C:
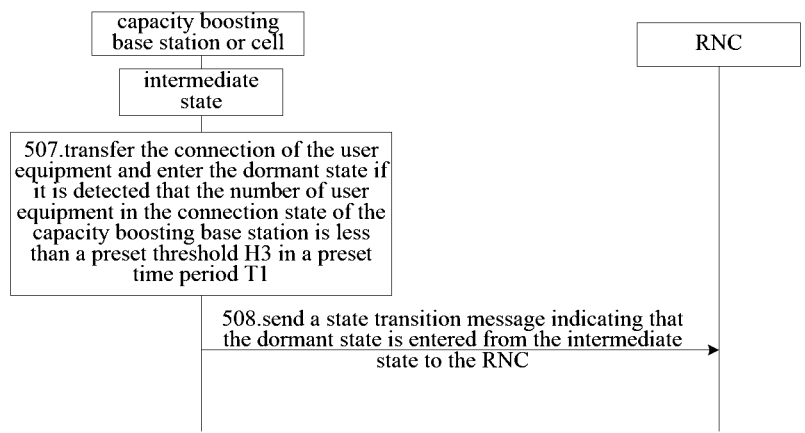
FIG. 10C is a flowchart illustrating a capacity boosting base station or cell entering a dormant state from an intermediate state in an implementation according to an embodiment of the invention.

(2) Referring to FIG. 10*b*, the capacity boosting base station or cell enters the dormant state from the normal state.

In Step 504, in a case where the capacity boosting base station or cell is in the normal state, the cellBarred parameter of the System Information Block Type1 message of the capacity boosting base station or cell is set to be "barred" and the connections of all user equipment in the connection state are transferred to their coverage base station or cell, if it is detected that the load of the capacity boosting base station or cell is less than the preset threshold H1 and the number of user equipment, which initiates the special service, of the capacity boosting base station or cell is less than the preset threshold H2. The capacity boosting base station or cell enters the dormant state from the normal state after transferring of the connections is completed.

In Step 505, the capacity boosting base station or cell notifies the RNC of a state transition message indicating that the capacity boosting base station or cell enters the dormant state from the normal state.

In Step 506, a Physical Cell ID of the capacity boosting base station or cell is added into the Black Listed cells per freq list of the E-UTRAN Frequency and priority info list of the System Information Block Type19 message of the coverage base station or cell and system information of the coverage base station or cell is updated, after the RNC receives the message indicating that the capacity boosting base station or cell quits the normal state.

(3) The capacity boosting base station or cell enters the dormant state from the intermediate state.

In Step 507, in a case where the capacity boosting base station or cell is in the intermediate state, the capacity boosting base station or cell transfers connections of all the user equipment in the connection state to their coverage base station or cell and the capacity boosting base station or cell enters the dormant state from the intermediate state, if it is detected that the number of the user equipment in the connection state of the capacity boosting base station or cell is always less than a preset threshold H3 in a preset time period T1.

In Step 508, the capacity boosting base station or cell notifies the RNC of a state transition message indicating that the capacity boosting base station or cell enters the dormant state from the intermediate state.

(4) Referring to FIG. 10*d*1, the capacity boosting base station or cell enters the normal state from the intermediate state.

In Step 509, in a case where the capacity boosting base station or cell is in the intermediate state, the base station controller sends a first activation request to the capacity boosting base station or cell to request the capacity boosting base station or cell to enter the normal state, if the base station controller detects that the number of times of transferring the connection of the user equipment in the connection state of the coverage base station or cell to the capacity boosting base station or cell in a preset time period T2 is greater than a preset threshold H4, or if the base station controller detects that the success rate of transferring the connection of the user equipment in the connection state of the coverage base station or cell to the capacity boosting base station or cell is less than a preset threshold H5.

In Step 510, the cellBarred parameter of the System Information Block Type1 message of the capacity boosting base station or cell is set to be "notBarred", system information is updated and the capacity boosting base station or cell enters the normal state, after the capacity boosting base station or cell receives the first activation request.

In Step 511, the capacity boosting base station or cell feeds back a response message of the first activation request to the base station controller after the capacity boosting base station or cell enters the normal state. The response message is configured to notify the base station controller that the capacity boosting base station or cell enters the normal state from the intermediate state.

In Step 512, the Physical Cell ID of the capacity boosting base station or cell is deleted from the Black Listed cells per freq list of the E-UTRAN Frequency and priority info list of the System Information Block Type19 message of the coverage base station or cell and system information of the coverage base station or cell is updated, after the base station controller receives the response message of the first activation request sent by the capacity boosting base station or cell.

Alternatively, referring to FIG. 10d2, the capacity boosting base station or cell enters the normal state from the intermediate state.

In Step 513, in a case where the capacity boosting base station or cell is in the intermediate state, the base station controller sends a first activation request to the capacity boosting base station or cell to request the capacity boosting base station or cell to enter the normal state, if the base station controller detects that the load of the coverage base station or cell is greater than a preset threshold H6.

In Step 514, the cellBarred parameter of the System Information Block Type1 message of the capacity boosting base station or cell is set to be "notBarred", system information is updated and the capacity boosting base station or cell enters the normal state, after the capacity boosting base station or cell receives the first activation request.

In Step 515, the capacity boosting base station or cell feeds back a response message of the first activation request to the base station controller after the capacity boosting base station or cell enters the normal state. The response message is configured to notify the base station controller that the capacity boosting base station or cell enters the normal state.

In Step 516, the Physical Cell ID of the capacity boosting base station or cell is deleted from the Black Listed cells per freq list of the E-UTRAN Frequency and priority info list of the System Information Block Type19 message of the coverage base station or cell and system information of the coverage base station or cell is updated, after the base station controller receives the response message of the first activation request sent by the capacity boosting base station or cell.

Figure 10E:
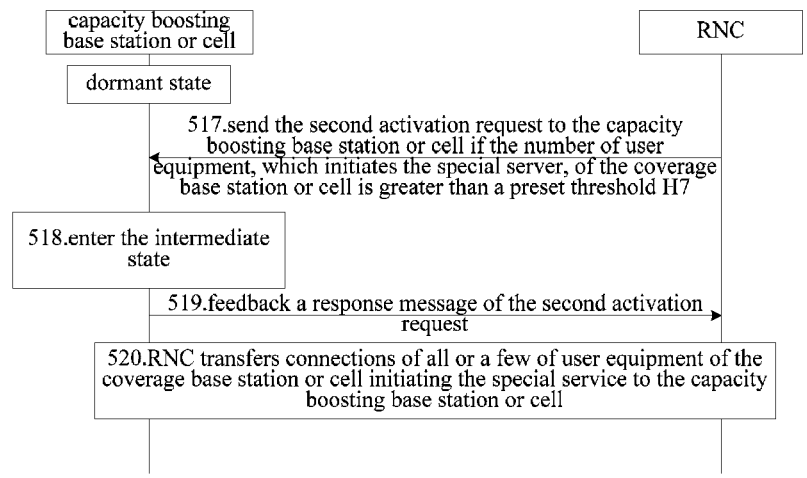
FIG. 10E is a flowchart illustrating a capacity boosting base station or cell entering an intermediate state from a dormant state in an implementation according to an embodiment of the invention.

(5) Referring to FIG. 10e, the capacity boosting base station or cell enters the intermediate state from the dormant state.

In Step 517, in a case where the capacity boosting base station or cell is in the dormant state, the base station controller sends a second activation request to the capacity boosting base station or cell to request the capacity boosting base station or cell to enter the intermediate state, if the base station controller detects that the number of user equipment, which initiates the special service, of the coverage base station or cell is greater than a preset threshold H7.

In Step 518, the capacity boosting base station or cell enters the intermediate state after the capacity boosting base station or cell receives the second activation request.

In Step 519, the capacity boosting base station or cell feeds back a response message of the second activation request to the base station controller after the capacity boosting base station or cell enters the intermediate state. The response message is configured to notify the base station controller that the capacity boosting base station or cell enters the intermediate state from the dormant state.

In Step 520, the coverage base station or cell transfers connections of all or a few of the user equipment initiating the special service to the capacity boosting base station or cell, after the base station controller receives the response message of the second activation request sent by the capacity boosting base station or cell.

Figure 10F:
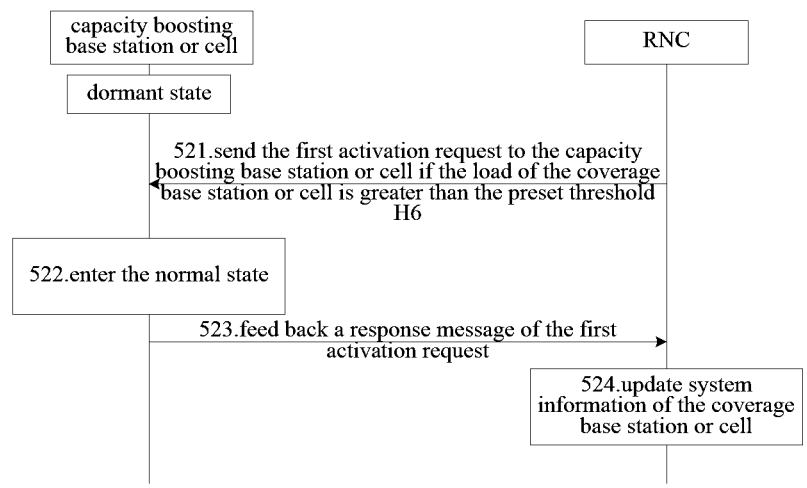
FIG. 10F is a flowchart illustrating a capacity boosting base station or cell entering a normal state from a dormant state in an implementation according to an embodiment of the invention.

(6) Referring to FIG. 10f, the capacity boosting base station or cell enters the normal state from the dormant state.

In Step 521, in a case where the capacity boosting base station or cell is in the dormant state, the base station controller sends a first activation request to the capacity boosting base station or cell to request the capacity boosting base station or cell to enter the normal state, if the base station controller detects that the load of the coverage base station or cell is greater than a preset threshold H6.

In Step 522, the cellBarred parameter of the System Information Block Type1 message of the capacity boosting base station or cell is set to be "notBarred" and the capacity boosting base station or cell enters the normal state, after the capacity boosting base station or cell receives the first activation request.

In Step 523, the capacity boosting base station or cell feeds back a response message of the first activation request to the base station controller after the capacity boosting base station or cell enters the normal state. The response message is configured to notify the base station controller that the capacity boosting base station or cell enters the normal state.

In Step 524, the Physical Cell ID of the capacity boosting base station or cell is deleted from the Black Listed cells per freq list of the E-UTRAN Frequency and priority info list of the System Information Block Type19 message of the coverage base station or cell and system information of the coverage base station or cell is updated, after the base station controller receives the response message of the first activation request sent by the capacity boosting base station or cell.

It should be noted that, in the above specific embodiments, all the signaling interacted between the base station controller and the capacity boosting base station or cell, such as the first activation request, the second activation request, the response message of the first activation request, the response message of the second activation request, and the state transition message of the capacity boosting base station or cell, may be directly transmitted between the base station controller and the capacity boosting base station or cell, and may be transmitted via an unvarnished transmission of core network (such as a RIM process).

In other specific embodiments, the power saving method for the base station in which the coverage base station or cell uses Radio Access Network (GERAN) of Global System for Mobile communication (GSM) or Enhanced Data Rate for GSM Evolution (EDGE) and the capacity boosting base station or cell uses evolved Universal Terrestrial Radio Access Network (E-UTRAN) is similar to the above power saving method for the base station in which the coverage base station or cell uses Universal Terrestrial Radio Access Network (UTRAN) and the capacity boosting base station or cell uses evolved Universal Terrestrial Radio Access Network (E-UTRAN), and the difference lies in that the base station controller managing GERAN base station or cell is BSC (Base Station Controller).

In a case where the capacity boosting base station or cell is in the intermediate state, the capacity boosting base station or cell may transfer the connection of the user equipment whose special service is finished and which is still in the connection state to the coverage base station or cell.

In other specific embodiments, the capacity boosting base station or cell may transit the state between any two states but does not relate to the third state. For example, the capacity boosting base station or cell transits the state between the normal state and the intermediate state but does not enter the dormant state. Alternatively, the capacity boosting base station or cell transits the state between the intermediate state and the dormant state but does not enter the normal state.

In all the above embodiments, the capacity boosting base station or cell may notify the base station controller managing the coverage base station or cell of a state transition message actively or by a response message of the first activation request or a response message of the second activation request, when the capacity boosting base station or cell transits the state among the three states. In this way, the base station controller managing the coverage base station or cell may determine the state that the capacity boosting base station or cell is in. In fact, in other specific embodiments, the base station controller managing the coverage base station or cell may only know whether the capacity boosting base station or cell is in the normal state without knowing whether the capacity boosting base station or cell is in the intermediate state or the dormant state in a case where the capacity boosting base station or cell is not in the normal state. That is, the capacity boosting base station or cell does not notify the base station controller managing the coverage base station or cell of the state transition message after the capacity boosting base station or cell enters the dormant state from the intermediate state. In this case, the second activation request has to be sent to the capacity boosting base station or cell in the dormant state and in the intermediate state when the base station controller managing the coverage base station or cell sends the second activation request. The capacity boosting base station or cell in the intermediate state does not transit the current state if the capacity boosting base station or cell receives the second activation request.

The technical solutions according to the embodiments of the invention may also be applicable to a future network architecture in which the data and the signaling are separated. In the network architecture, the coverage base station or cell of Network One is also referred to as a Signaling Base Station (SBS) for creating a Control Plane (also referred to as a Signaling Plane, Signaling Plane) and a User Plane (also referred to as a Data Plane, Data Plane) between the network and the user equipment, or only for creating a Control Plane (Signaling Plane) between the network and the user equipment. The capacity boosting base station or cell of Network Two is also referred to as a Data Base Station (DBS) only for creating a User Plane (Data Plane) between the network and the user equipment. By applying the technical solutions of the invention, the capacity boosting base station or cell (Data Base Station) may transit the state between the intermediate state and the dormant state to save power.

In a case where the capacity boosting base station or cell is in the intermediate state, a common signal of the capacity boosting base station or cell, such as pilot frequency, synchronization, broadcasting, paging, etc., is compressed and chipped based on actual user bearing condition (for example, whether there is user equipment in the connection state) and actual requirement of the user equipment in the connection state on the common signal (for example, whether the user equipment needs to acquire a pilot signal, a broadcast message, a synchronization signal, etc.), to reduce common signal redundancy and thus save power.

Figure 11:
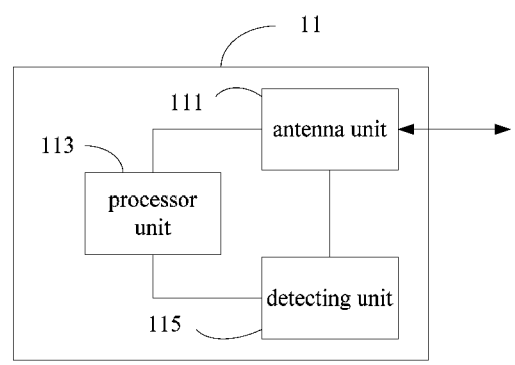
FIG. 11 is a schematic structural diagram of a base station controller according to an embodiment of the invention.

Embodiments of the invention also provide a base station and a user terminal for implementing the above method. The base station in the embodiments may be a base station in the above various communication systems. The device embodiments described below may implement process steps and functions of the relevant method embodiments. Reference is made to FIG. 11, which is a schematic structural diagram of a base station controller according to an embodiment of the invention.

The base station controller in the embodiment of the invention may be a base station controller in the above various communication systems. The base station controller 11 in the embodiments includes: an antenna unit 111, configured to send a second activation request to a capacity boosting base station if the number of user equipment sending a service request within a coverage of a coverage base station is greater than a first threshold, where the second activation request is configured to request the capacity boosting base station in a dormant state to enter an intermediate state from the dormant state, and the intermediate state indicates a state in which the capacity boosting base station bears user equipment in a connection state but does not bear user equipment in an idle state; and a processor unit 113, configured to transfer a connection of the user equipment to the capacity boosting base station in the intermediate state after the capacity boosting base station enters the intermediate state.

The base station controller 11 may further include a detecting unit 115, configured to detect whether the number of user equipment initiating a service within the coverage of the coverage base station is greater than the first threshold, for the sending unit to determine whether to send the second activation request.

The service initiated by the user equipment initiating the service within the coverage of the coverage base station includes:

a service that can not be born by the coverage base station but only can be born by the capacity boosting base station or cell; or a service with less power consumption or higher power efficiency when being born by the capacity boosting base station compared with being born by the coverage base station; or a service with better user experience when being born by the capacity boosting base station compared with being born by the coverage base station.

The processor unit may send a first activation request to the capacity boosting base station in the intermediate state to cause the capacity boosting base station in the intermediate state to enter a normal state, if the number of times of transferring the connection of the user equipment to the capacity boosting base station in the intermediate state is greater than a second threshold. The processor unit may send the first activation request to the capacity boosting base station in the intermediate state to cause the capacity boosting base station in the intermediate state to enter a normal state, if a success rate of transferring the connection of the user equipment to the capacity boosting base station in the intermediate state is less than a third threshold. The processor unit may send the first activation request to the capacity boosting base station in the intermediate state to cause the capacity boosting base station in the intermediate state to enter a normal state, if the amount of load of the coverage base station is greater than a fourth threshold. The processor unit may send the first activation request to the capacity boosting base station in the intermediate state to cause the capacity boosting base station in the dormant state to enter a normal state, if the amount of load of the coverage base station is greater than a fifth threshold.

Figure 12:
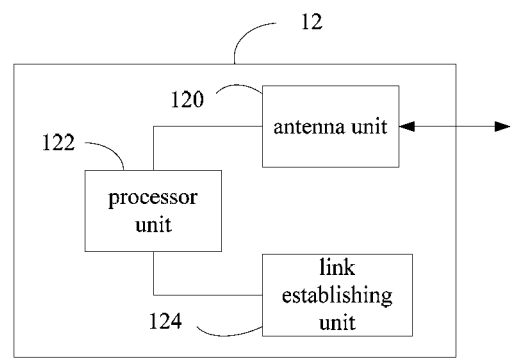
FIG. 12 is a schematic structural diagram of a base station according to an embodiment of the invention.

Furthermore, an embodiment of the invention provides a base station used in the above various communication systems. Reference is made to FIG. 12, which is a schematic structural diagram of a base station 12 according to the embodiment of the invention. The base station 12 includes:

an antenna unit 120, configured to receive a second activation request for requesting the base station to enter an intermediate state from a dormant state, where the base station in the intermediate state bears user equipment in a connection state but does not bear user equipment in an idle state, and the base station in the dormant state does not bear user equipment in any state;

a processor unit 122, configured to, in response to the second activation request, enter the intermediate state from the current dormant state and send a response message of the second activation request to a base station controller; and a link establishing unit 124, configured to establish a connection with the user equipment whose connection is transferred to the base station after the intermediate state is entered.

Furthermore, the processor unit 120 may further cause the base station to enter the dormant state from the current intermediate state, if the number of user equipment connected to the base station is always less than a seventh threshold in a first time period.

In practice, the antenna unit 102 is further configured to receive a first activation request for requesting the base station to enter a normal state from the intermediate state or the dormant state; and the processor unit 122 is further configured to enter the normal state from the current intermediate state or the current dormant state based on the first activation request. The processor unit is further configured to enter the intermediate state from the current normal state, if the total amount of load of the base station is less than a sixth threshold and the number of user equipment connected to the base station is greater than an eighth threshold.

The processor unit 122 is configured to enter the intermediate state from the current normal state includes: set a cellBarred parameter of a System Information Block Type1 message of the capacity boosting base station to be barred and update system information to cause the capacity boosting base station or cell to enter the intermediate state from the normal state.

The processor unit 122 is further configured to cause the base station to enter the dormant state from the current normal state, if the total amount of load of the base station is less than a sixth threshold and the number of user equipment connected to the base station is less than an eighth threshold.

The processor unit 122 is configured to cause the base station to enter the dormant state from the current normal state includes:

set a cellBarred parameter of a System Information Block Type1 message of the capacity boosting base station to be barred and transfer connections of all the user equipment in the connection state to their coverage base station to cause the capacity boosting base station to enter the dormant state from the normal state.

The processor unit 122 is further configured to notify the base station controller of a state transition message indicating that the base station enters the intermediate state after the base station enters the intermediate state, to cause the base station controller to reset a cell reselection parameter of the coverage base station and forbid user equipment in the idle state of the coverage base station from reselecting the capacity boosting base station located within the coverage of the coverage base station.

The base station controller and the base station described above may further constitute a communication system which uses the power saving method to reduce power consumption.

The communication system according to the embodiment of the invention includes a capacity boosting base station, a coverage base station and a base station controller.

The base station controller is configured to send a second activation request to the capacity boosting base station if the number of user equipment sending a service request within a coverage of the coverage base station is greater than a first threshold, where the second activation request is configured to request the capacity boosting base station in a dormant state to enter an intermediate state from the dormant state, and the intermediate state indicates a state in which the capacity boosting base station bears user equipment in a connection state but does not bear user equipment in an idle state; and to transfer a connection of the user equipment to the capacity boosting base station in the intermediate state after the capacity boosting base station enters the intermediate state.

The capacity boosting base station is located within the coverage of the coverage base station and is configured to receive the second activation request for requesting the capacity boosting base station to enter the intermediate state from the dormant state, where the capacity boosting base station in the intermediate state bears user equipment in the connection state but does not bear user equipment in the idle state, and the capacity boosting base station in the dormant state does not bear user equipment in any state; to enter the intermediate state from the current dormant state and send a response message of the second activation request to the base station controller in response to the second activation request; and to establish a connection with the user equipment whose connection is transferred to the capacity boosting base station after the intermediate state is entered.

The power saving method for the base station according to the embodiments of the invention may be completely performed on the above communication system.

It should be understood by those skilled in the art that all or a few of the steps in the various methods in the above embodiments may be performed by related hardware instructed by a program. The program may be stored in a computer readable storage medium, and the storage medium includes ROM, RAM, a diskette or a compact disk, etc.

What is claimed is:

1. A power saving method for controlling base station operation, comprising:
    determining that a number of user equipment sending service requests within coverage of a coverage base station is greater than a first threshold;
    sending, in response to the determining, an intermediate state activation request to a capacity-boosting base station, wherein the intermediate state activation request is configured to request the capacity-boosting base station in a dormant state to enter an intermediate state from the dormant state, and the intermediate state is a state in which the capacity-boosting base station bears user equipment in a connection state but does not bear user equipment in an idle state; and
    transferring a connection of a user equipment sending service requests within the coverage of the coverage base station to the capacity-boosting base station after the capacity-boosting base station enters the intermediate state.

2. The method according to claim 1,
    wherein the service requests relate to:
    a service that cannot be borne by the coverage base station but can be borne by the capacity-boosting base station; or
    a service with less power consumption or higher power efficiency when being borne by the capacity-boosting base station compared with being borne by the coverage base station; or
    a service with better user experience when being borne by the capacity-boosting base station compared with being borne by the coverage base station.

3. The method according to claim 1, further comprising:
sending a normal state activation request to the capacity-boosting base station to cause the capacity-boosting base station in the intermediate state to enter a normal state in response to at least one of the following conditions being met:
a number of times of transferring the connection of the user equipment to the capacity-boosting base station in the intermediate state being greater than a second threshold; or
a success rate of transferring the connection of the user equipment to the capacity boosting base station in the intermediate state being less than a third threshold; or
an amount of load of the coverage base station being greater than a fourth threshold.

4. The method according to claim 1, further comprising:
sending a normal state activation request to the capacity-boosting base station to cause the capacity boosting base station in the dormant state to enter a normal state in response to an amount of load of the coverage base station being greater than a fifth threshold.

5. The method according to claim 1, further comprising:
in a case where the user equipment in the idle state is connected to the capacity-boosting base station in the intermediate state, establishing a connection between the user equipment and the coverage base station to cause the user equipment in the idle state to transition to the connection state, and connecting the user equipment to the-capacity-boosting base station in the intermediate state by transferring the connection of the user equipment between the coverage base station and the capacity-boosting base station.

6. A power saving method for controlling base station operation, comprising:
receiving an intermediate state activation request for requesting a capacity-boosting base station to enter an intermediate state from a dormant state, wherein the capacity-boosting base station in the intermediate state bears user equipment in a connection state but does not bear user equipment in an idle state, and the capacity-boosting base station in the dormant state does not bear user equipment in any state;
entering the intermediate state from the dormant state and sending a response message corresponding to the intermediate state activation request to a base station controller in response to the intermediate state activation request; and
establishing a connection with a user equipment, wherein the connection of the user equipment is transferred to the capacity-boosting base station after the capacity-boosting base station enters the intermediate state.

7. The method according to claim 6, further comprising:
the capacity-boosting base station entering the dormant state from the intermediate state in response to the number of users connected to the capacity-boosting base station being less than a threshold for a first time period.

8. The method according to claim 6, further comprising:
receiving a normal state activation request for requesting the capacity-boosting base station to enter a normal state from the intermediate state or the dormant state; and
the capacity-boosting base station entering the normal state from the intermediate state or the dormant state in response to the normal state activation request.

9. The method according to claim 8, further comprising:
the capacity-boosting base station entering the intermediate state from the normal state in response to a total amount of load of the capacity-boosting base station being less than a threshold amount and a number of user equipment connected to the capacity-boosting base station being greater than a threshold number.

10. The method according to claim 9, wherein the capacity-boosting base station entering the intermediate state from the normal state comprises:
setting a cellBarred parameter of a System Information Block Type1 message of the capacity-boosting base station to be barred and updating system information.

11. The method according to claim 6, further comprising:
the capacity-boosting base station entering the dormant state from the current normal state in response to a total amount of load of the capacity boosting base station being less than a threshold amount and a number of user equipment connected to the capacity-boosting base station being less than a threshold number.

12. The method according to claim 11, wherein the capacity-boosting base station entering the dormant state from the normal state comprises:
setting a cellBarred parameter of a System Information Block Type1 message of the capacity boosting base station to be barred and transferring connections of each user connected with the capacity-boosting base station to a respective coverage base station.

13. The method according to claim 6, wherein the capacity-boosting base station notifies the base station controller managing the coverage base station of a state transition message indicating that the capacity-boosting base station has entered the intermediate state after the capacity boosting base station enters the intermediate state, to cause the base station controller to reset a cell reselection parameter of the coverage base station and forbid a user in the idle state of the coverage base station from reselecting the capacity-boosting base station located within a coverage of the coverage base station.

14. A base station, comprising:
an antenna, configured to receive an intermediate state activation request for requesting the base station to enter an intermediate state from a dormant state, wherein the base station in the intermediate state bears user equipment in a connection state but does not bear user equipment in an idle state, and the base station in the dormant state does not bear user equipment in any state;
a processor, configured to enter the intermediate state from the dormant state and send a response message corresponding to the intermediate state activation request to a base station controller in response to the intermediate state activation request; and
a communication link interface, configured to establish connections with user equipment having connections transferred to the base station after the intermediate state is entered.

15. The base station according to claim 14, wherein the processor is further configured to enter the dormant state from the intermediate state in response to a number of users connected to the base station being less than a threshold for a first time period.

16. The base station according to claim 14, wherein
the antenna is further configured to receive a normal state activation request for requesting the base station to enter a normal state from the intermediate state or the dormant state; and the processor is further configured to enter the normal state from the intermediate state or the dormant state in response to the normal state activation request.

17. The base station according to claim 16, wherein the processor is further configured to enter the intermediate state from the normal state in response to a total amount of load of the base station being less than a threshold amount and a number of user equipment connected to the base station being greater than a threshold number.

18. The base station according to claim 17, wherein the processor being configured to enter the intermediate state from the normal state comprises the processor being configured to: set a cellBarred parameter of a System Information Block Type1 message of the base station to be barred and update system information.

19. The base station according to claim 14, wherein the processor is further configured to enter the dormant state from the normal state in response to a total amount of load of the base station being less than a threshold amount and a number of user equipment connected to the base station being less than a threshold number.

20. The base station according to claim 19, wherein the processor being configured to enter the dormant state from the current normal state comprises the processor being configured to:
set a cellBarred parameter of a System Information Block Type1 message of the base station to be barred and transfer connections of each user connected with the base station to a respective coverage base station.

* * * * *